United States Patent
Rangaraju et al.

(10) Patent No.: US 12,032,426 B2
(45) Date of Patent: Jul. 9, 2024

(54) SMART RESOURCE ALLOCATION FRAMEWORK FOR DYNAMIC ALLOCATION OF SYSTEM RESOURCES IN PERSONAL COMPUTING DEVICES (PCDs) THAT EMPLOY WIRELESS MODEMS

(71) Applicant: QUALCOMM INCORPORATED, San Diego, CA (US)

(72) Inventors: Karthik Rangaraju, Hyderabad (IN); Sumit Gemini, Delhi (IN); Nikhil Kumar Kansal, Hyderabad (IN); Nirav Narendra Desai, Hyderabad (IN); Venkata Biswanath Devarasetty, Hyderabad (IN); Lakshmi Narayana Panuku, Hyderabad (IN); Venkatesh Ravipati, Guntur (IN)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/891,893

(22) Filed: Aug. 19, 2022

(65) Prior Publication Data
US 2024/0061490 A1 Feb. 22, 2024

(51) Int. Cl.
*G06F 1/3228* (2019.01)
*G06F 1/3203* (2019.01)
(Continued)

(52) U.S. Cl.
CPC .......... *G06F 1/3228* (2013.01); *G06F 9/5033* (2013.01); *H04M 3/2227* (2013.01);
(Continued)

(58) Field of Classification Search
CPC .... G06F 1/3203; G06F 1/3206; G06F 1/3209; G06F 1/3228; G06F 9/5033; H04M 3/2227
(Continued)

(56) References Cited

U.S. PATENT DOCUMENTS 6,415,388 B1 * 7/2002 Browning ............... G06F 1/324
702/132
2004/0111308 A1 6/2004 Yakov
(Continued)

FOREIGN PATENT DOCUMENTS

| CN | 104580647 A | 4/2015 |
| CN | 108509323 A | 9/2018 |
| WO | 2017069842 A1 | 4/2017 |

OTHER PUBLICATIONS

Related PCT App. Ser. No. PCT/US2023/028286, filed Jul. 20, 2023, International Search Report and Written Opinion of the International Searching Authority (ISA = EPO), transmitted on Nov. 16, 2023 (14 Pages).

*Primary Examiner* — Ji H Bae
(74) *Attorney, Agent, or Firm* — Smith Tempel Blaha LLC/Qualcomm

(57) ABSTRACT

Systems, methods and computer-readable mediums may be used in portable computing devices (PCDs) for dynamically allocating system resources in a way that prevents or lessens degradation of power and performance KPIs while also avoiding temperature increases in the PCD that can create unpleasant user experiences. A smart resource allocation framework (SRAF) is triggered when a call is received or placed. Once triggered, the SRAF framework monitors a preselected set of state conditions to determine whether or not to place the wireless modem in a modem power-performance (Mod. Pow.-Perf) mode. If it determines that modem is to be placed in the Mod. Pow.-Perf. mode, a Mod. Pow.-Perf. process is performed dynamically allocates system resources and preferably also triggers a thermal framework that performs power reduction in one or more non-modem processing cores.

24 Claims, 5 Drawing Sheets

(51) Int. Cl.
  *G06F 1/3206* (2019.01)
  *G06F 1/3209* (2019.01)
  *G06F 9/50* (2006.01)
  *H04M 3/22* (2006.01)

(52) U.S. Cl.
  CPC .......... *G06F 1/3203* (2013.01); *G06F 1/3206* (2013.01); *G06F 1/3209* (2013.01)

(58) Field of Classification Search
  USPC ................................ 713/300, 320; 455/403
  See application file for complete search history.

(56) References Cited

U.S. PATENT DOCUMENTS

| | | | |
|---|---|---|---|
| 2008/0175227 A1* | 7/2008 | Moore .................. | G06F 1/3209 370/352 |
| 2009/0275355 A1* | 11/2009 | Tan ..................... | H04W 52/288 455/574 |
| 2012/0284552 A1* | 11/2012 | Archer, Jr. ............ | G06F 1/3203 713/324 |
| 2014/0122689 A1* | 5/2014 | Park ................... | H04L 49/9068 709/224 |
| 2016/0036596 A1* | 2/2016 | Fukushima ........ | H04N 1/00002 370/241 |
| 2017/0153693 A1* | 6/2017 | Duale .................. | G06F 1/3293 |
| 2018/0206103 A1 | 7/2018 | Ventrapragada et al. | |

\* cited by examiner

SMART RESOURCE ALLOCATION FRAMEWORK FOR DYNAMIC ALLOCATION OF SYSTEM RESOURCES IN PERSONAL COMPUTING DEVICES (PCDs) THAT EMPLOY WIRELESS MODEMS

DESCRIPTION OF THE RELATED ART

Wireless devices use wireless modems to directly connect and communicate with wireless networks. Most portable computing devices (PCDs), such as mobile phones, tablet portable computers (i.e., iPads), laptops, smart wearables, and Internet of Things (IoT) devices employ wireless modems. PCDs all run on batteries when not being charged. In such devices, severe degradation of key performance indicators (KPIs) for power and performance can occur if system resources are not properly and efficiently utilized. This is especially true for currently available and upcoming PCDs that incorporate newer wireless modem features for higher bandwidth (BW) wireless communications protocols (e.g., fourth generation (4G), Long Term Evolution (LTE), fifth generation (5G), 5G New Radio (NR), sixth generation (6G), etc.).

Smart frameworks generally do not exist for proactively allocating system resources in PCDs in a way that ensures that performance and power KPIs are not degraded. Some PCDs implement a use-case thermal framework that 1) uses output of one or more temperature sensors to detect when calls of long duration have caused the temperature of the PCD to rise to a point that the user is sensing the heat from the PCD and then 2) disables modem features to reduce power usage until the temperature is slowly reduced to the point that the heat is no longer sensed by the user. One disadvantage of this type of thermal framework is that disabling modem-specific features to reduce power usage to thereby reduce temperature degrades modem performance. Another disadvantage is that the thermal framework is not proactive because it is only triggered after the user has sensed the heat during a call, i.e., it does not proactively mitigate the temperature increase before the heat is sensed by the user. Additionally, this type of thermal framework is only triggered during the use case of long duration calls.

Some PCDs dynamically allocate system resources in an attempt to prevent degradation of power and performance KPIs, but such allocation schemes are only partially effective. In system on a chip (SoC) technology used in more recently developed PCDs, last-level cache (LLC) has been introduced to improve system performance and reduce use-case power usage and effects. LLC allocation is currently performed in two ways: "static reserved" allocation and "free pool for opportunistic" allocation. Each system "client" is allocated a priority level and a maximum storage capacity of the LLC in kilobytes (KB) and may or may not be assigned a reserved area in the LLC. This allocation is performed on a one-time basis using a system cache table defined in the kernel code of the PCD operating system (OS).

There are disadvantages to this type of resource allocation scheme as will be shown by the following example. Assuming a relatively simple system in which the central processing unit (CPU) and modem of the PCD are the only clients accessing system LLC, and assuming an LLC size of 4 megabytes (MB), of which 3 MB are reserved for the CPU and 1 MB is reserved for the modem, even if the CPU is not fully utilizing its 3 MB of reserved LLC, the modem is not allocated more than 1 MB of LLC even if it is starving for system cache. Such scenarios are very common when the user is performing a voice call or a data call and reveal that system cache is a very important resource that is not being correctly and extensively utilized. In such scenarios, long duration NR/LTE calls result in more radio frequency (RF) dissipation, which results in heat accumulation near the user's ear that creates an unpleasant user experience. As indicated above, the current thermal framework solution to this problem is to disable modem-specific features to reduce power usage and thus temperature, which results in the aforementioned disadvantages.

A need exists for systems and methods for use in PCDs with wireless modems for more efficiently, proactively and dynamically allocating system resources in a way that prevents or lessens degradation of power and performance KPIs while also avoiding temperature increases in the PCD that can create unpleasant experiences for the user.

SUMMARY OF THE DISCLOSURE

Systems, methods, computer-readable media, and other examples are disclosed herein for providing a smart resource allocation framework (SRAF) implemented in a PCD having a wireless modem for dynamic allocation of system resources.

A exemplary a PCD having a wireless modem comprises a resource management circuit disposed on one or more integrated circuit (IC) chips of the PCD. The resource management circuit can be configured to: determine if a call is received or placed by the PCD; monitor a preselected set of state conditions of the PCD in response to the call received or placed by the PCD; determine, based at least partially on the monitored preselected set of state conditions, if the wireless modem is to be placed in a modem power-performance (Mod. Pow.-Perf.) mode; and in response to a determination that the wireless modem is be placed in the Mod. Pow.-Perf. mode, performing a Mod. Pow-Perf. process comprising at least one of: (1) dynamically updating one or more cache table entries associated with the wireless modem; (2) reducing power usage in one or more non-wireless modem processing cores to reduce a temperature of the PCD; and (3) allocating more bandwidth for the wireless modem.

An exemplary method performed in a resource management circuit disposed on one or more IC chips of the PCD comprises: determining if a call is received or placed by the PCD; monitoring a preselected set of state conditions of the PCD in response to the call received or placed by the PCD; determining, based at least partially on the monitored preselected set of state conditions, if the wireless modem is to be placed in a modem power-performance (Mod. Pow.-Perf) mode; and in response to determining that the wireless modem is be placed in the Mod. Pow.-Perf. mode, performing a Mod. Pow.-Perf. process comprising at least one of: (1) dynamically updating one or more cache table entries associated with the wireless modem; (2) reducing power usage in one or more non-wireless modem processing cores of the PCD to reduce a temperature of the PCD; and (3) allocating more bandwidth for the wireless modem.

An exemplary SRAF non-transitory computer-readable medium comprises computer instructions for execution by logic disposed on one or more IC chips of a PCD for achieving an SRAF for the PCD. The computer instructions comprise a first set of instructions that determine if a call is received or placed by the PCD; a second set of computer instructions that monitors a preselected set of state conditions of the PCD; and a third set of computer instructions that, in response to a determination that the wireless modem is be placed in the Mod. Pow.-Perf. mode, performs at least one of: (1) dynamically updating one or more cache table entries associated with the wireless modem; (2) reducing power usage in one or more non-wireless modem processing cores to reduce a temperature of the PCD; and (3) allocating more bandwidth for the wireless modem.

Another exemplary system comprises means disposed on one or more IC chips of the PCD for performing resource allocation. The means can be configured to: determine if a call is received or placed by the PCD; monitor a preselected set of state conditions of the PCD in response to the call received or placed by the PCD; determine, based at least partially on the monitored preselected set of state conditions, if the wireless modem is to be placed in a modem power-performance (Mod. Pow.-Perf.) mode; and, in response to a determination that the wireless modem is be placed in the Mod. Pow.-Perf. mode, performing a Mod. Pow-Perf. process comprising at least one of: (1) dynamically updating one or more cache table entries associated with the wireless modem; (2) reducing power usage in one or more non-wireless modem processing cores to reduce a temperature of the PCD; and (3) allocating more bandwidth for the wireless modem.

These and other features and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
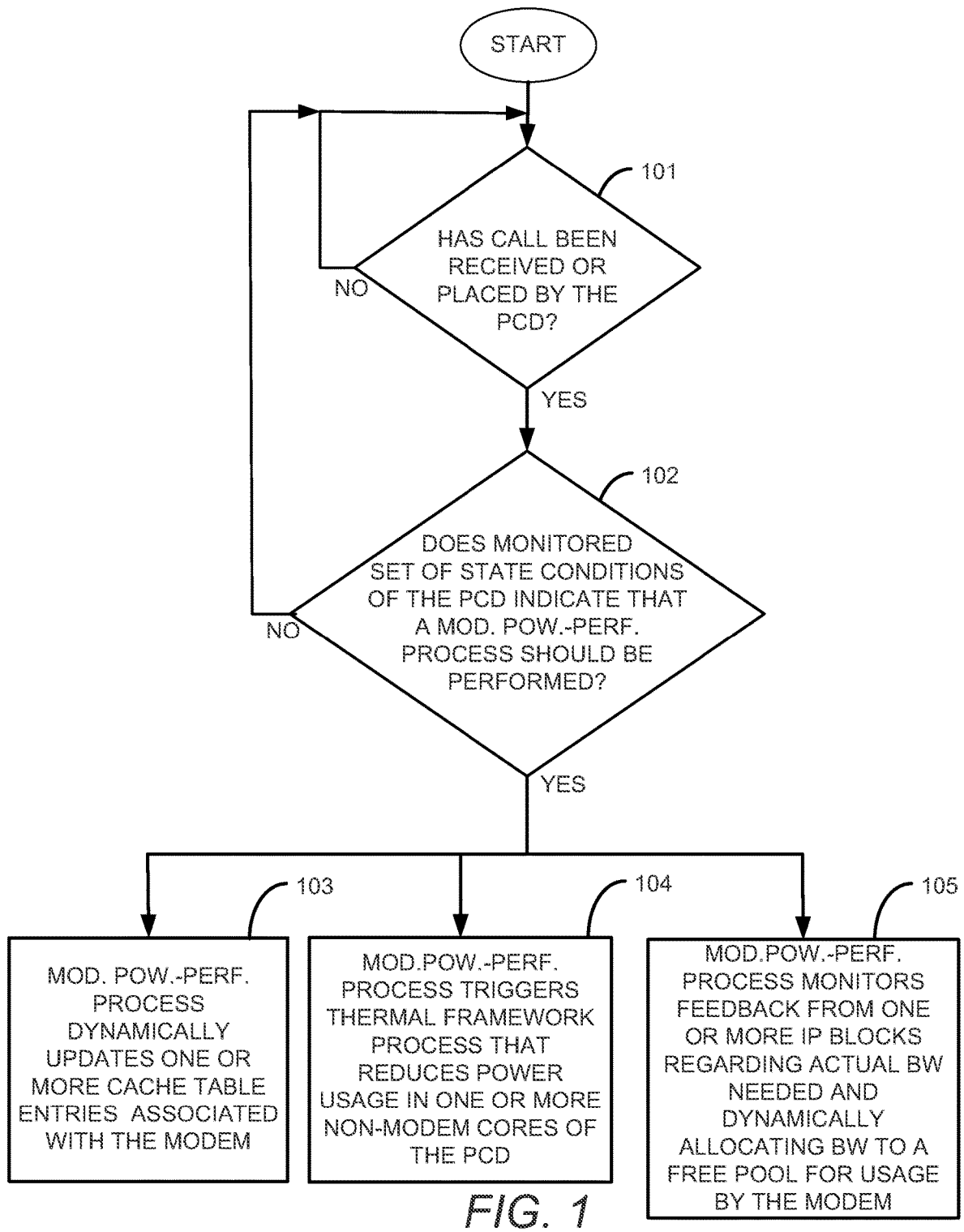
FIG. 1 is a flow diagram of a first portion of the smart resource allocation framework (SRAF) method in accordance with a representative embodiment.

The present disclosure discloses systems, methods and computer-readable mediums for use in PCDs with wireless modems for more efficiently, proactively and dynamically allocating system resources in a way that prevents or lessens degradation of power and performance KPIs while also avoiding temperature increases in the PCD that can create unpleasant experiences for the user. These systems, methods and computer-readable mediums provide a smart resource allocation framework (SRAF) that is triggered when a call is received or placed.

Once triggered, the SRAF framework monitors preselected criteria to determine whether or not to perform a modem power-performance (Mod. Pow.-Perf) process. If a determination is made that the Mod. Pow.-Perf. process is to be performed, it performs one or more of, and preferably all of, the following: (1) it dynamically updates modem system cache table entries to, for example, increase the size of cache memory allocated to the modem, change the rank of the modem for accessing cache memory, assign a high priority classification of the modem for accessing cache memory, change one or more policies relating to the modem accessing cache memory, allocate cache from some other subsystem pool to the modem, etc.; (2) it proactively triggers a thermal framework of the PCD to cause it to perform power reduction in one or more non-modem processing cores (e.g., power reduction in one or more CPU, GPU, CDSP cores, etc.) in order to reduce the temperature of the PCD before heat is sensed by the user; and (3) it monitors feedback received from one or more intellectual property (IP) blocks of the PCD regarding actual bandwidth needed by the IP block(s) and dynamically allocates bandwidth in excess of the actual bandwidth needed to a free pool that is accessible by the wireless modem for usage by the wireless modem for improving its performance.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or more memory devices. The memory may, for example, be multiple memories within the same computer system. The memory may also be multiple memories distributed amongst multiple computer systems or computing devices.

A "processor", as that term is used herein, can encompass an electronic component that is able to execute a computer program or executable computer instructions as well has hardware circuitry and combinations of hardware, software and/or firmware. References herein to a computer comprising "a processor" should be interpreted as one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

A computing device may include multiple subsystems, cores or other components. Such a computing device may be, for example, a portable computing device ("PCD"), such as a mobile phone, a tablet portable computer (e.g., an iPad), a laptop computer, a smart wearable device, and Internet of Things (IoT) device, a smartphone, a portable digital assistant (PDA), a portable game console (e.g., an Extended Reality (XR) device, a Virtual Reality (VR) device, an Augmented Reality (AR) device, or a Mixed Reality (MR) device), etc. having a wireless modem.

The multiple subsystems, cores or other components of a computing device may be included within the same integrated circuit chip or in different chips. An SoC is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity. Components of the SoC such as, for example, the GPU, DSPs, NPUs, the video processor, the wireless local area network (WLAN) processor, the modem and other components are typically implemented on the SoC in blocks of logic commonly referred to as intellectual property (IP) blocks. The term "IP block," as that term is used herein, is intended to denote an IP block of an SoC for cases in which the PCD employs an SoC as well as to denote combinational logic blocks employed for similar purposes in ICs of PCDs that are not necessarily SoCs.

A PCD may include resources that are shared among one or more SoC processors, processing cores or other SoC processing subsystems. For example, processors may share access to a main or system memory and cache memory of the PCD. A processor may also be associated with a local cache memory such as LLC, for example.

FIG. 1 is a flow diagram of the SRAF process in accordance with a representative embodiment. The SRAF process comprises a first process portion that monitors preselected criteria to determine whether the Mod. Pow.-Perf. process should be launched and a second portion that comprises the Mod. Pow.-Perf. process. At the step represented by block 101, a determination is made as to whether a call has been received or placed by the PCD. If so, the first portion of the SRAF process monitors a preselected set of state conditions of the PCD to determine whether the monitored preselected set of state conditions indicate that the modem should be placed in a Mod. Pow.-Perf. mode in which the Mod. Pow.-Perf. process is performed, as indicated by block 102. The preselected set of state conditions that can be monitored are described below in more detail with reference to FIG. 2A.

If it is determined at block 102 that the monitored preselected set of state conditions indicate that the wireless modem should be placed in the Mod. Pow.-Perf. mode, then the second portion of the SRAF process comprising the Mod. Pow.-Perf. process, represented by blocks 103, 104 and 105 in FIG. 1, is performed. The process represented by block 103 comprises dynamically updating one or more cache table entries associated with the modem of the PCD. The process represented by block 104 comprises triggering a thermal framework process of the PCD that reduces power usage in one or more non-wireless modem processing cores in order to reduce a temperature of the PCD. The process represented by block 105 comprises monitoring feedback from one or more IP blocks of the PCD regarding actual bandwidth needed by the block(s) and dynamically allocating bandwidth in excess of the actual bandwidth needed to a free pool that is accessible by the wireless modem for usage by the wireless modem for improving its performance. The process represented by blocks 103-105 are described below in more detail with reference to FIG. 2B.

Figure 2A:
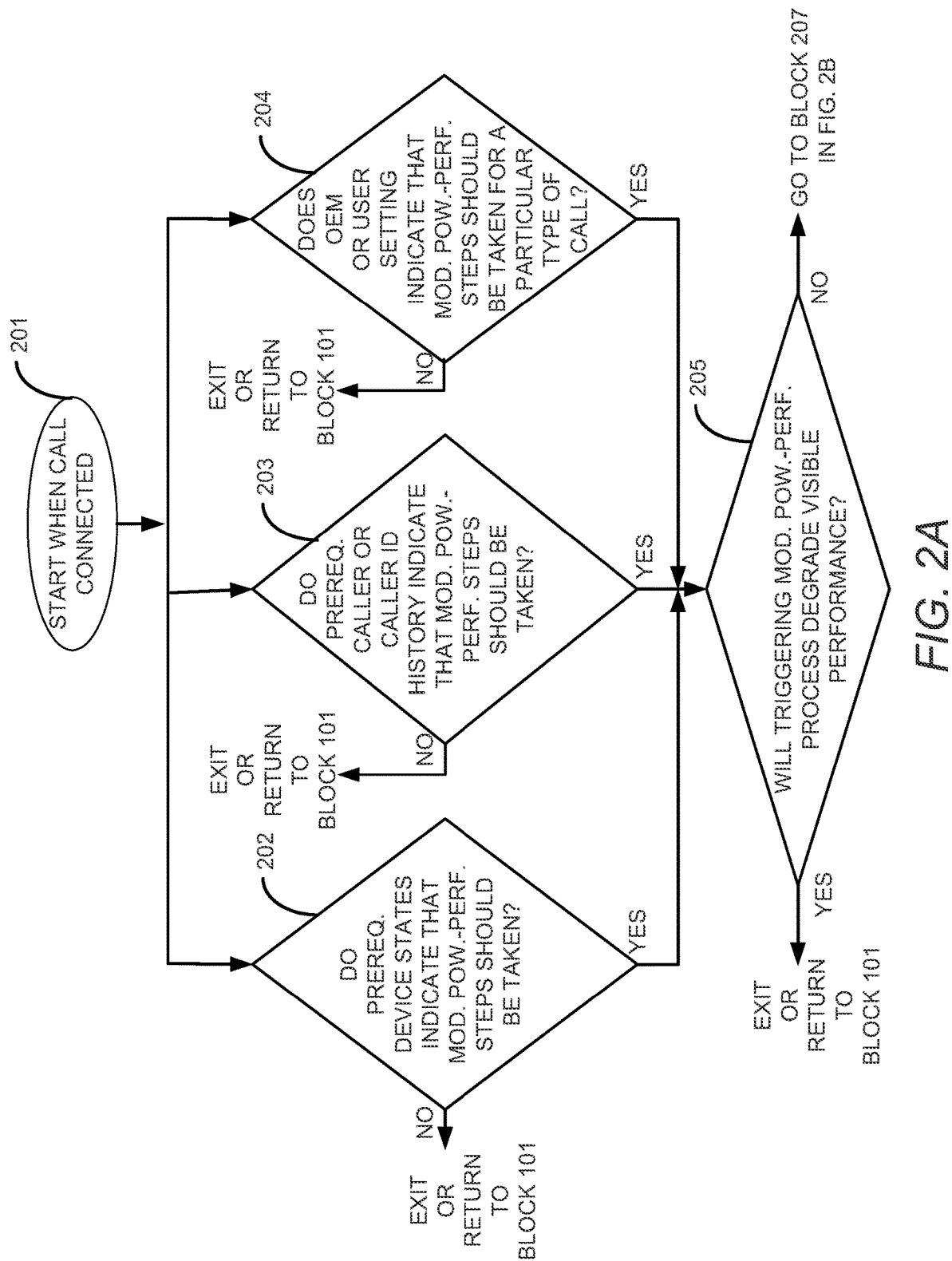
FIG. 2A is a flow diagram of the first portion of the SRAF method in accordance with a representative embodiment.
Figure 2B:
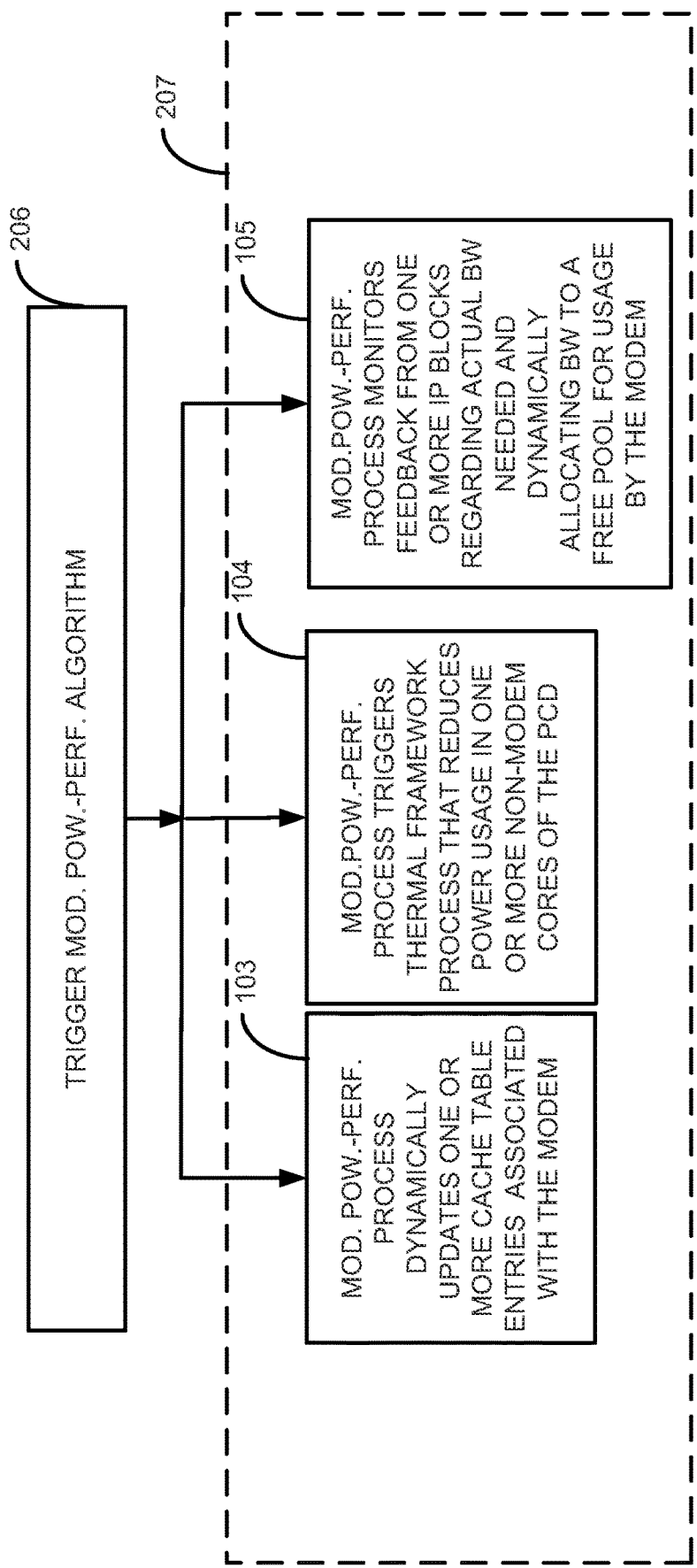
FIG. 2B is a flow diagram of a second portion of the SRAF process that is performed when the Mod. Pow.-Perf. process is triggered at the step represented by block 206 in FIG. 2B.

FIG. 2A is a flow diagram of the first portion of the SRAF process in accordance with a representative embodiment, which, as stated above, determines whether monitored preselected state conditions indicate that the Mod. Pow.-Perf. process should be launched, and if so, launches and performs the Mod. Pow.-Perf. process. The Mod. Pow.-Perf. process is described below with reference to FIG. 2B.

With reference to FIG. 2A, block 201 depicts the SRAF process being triggered, or launched, when a PCD user places a call or accepts a call with the PCD. For example, a caller/receiver event handler or modem stack event handler can detect when an incoming call is received or an outgoing call is placed and cause the SRAF process of the present disclosure to execute. Once this happens, the next series of steps represented by blocks 202-205 is performed by the SRAF process to determine whether the Mod. Pow.-Perf. process of the SRAF process is to be triggered, or launched.

In accordance with a representative embodiment, the preselected set of state conditions that is monitored include, for example, a state condition indicating that the display screen of the PCD is locked, a state condition indicating that the display screen is turned off, a state condition indicating that a proximity sensor has sensed that the PCD is near the user's ear, a state condition indicating that a light sensor has detected that the PCD is in the user's pocket or handbag indicating that the user is talking via a Bluetooth headset paired with the PCD.

Detection of one or more of these state conditions indicates that performing the Mod. Pow.-Perf. process will likely not detrimentally impact visible performance of the PCD. If one or more of these state conditions are detected, the process moves to block 205, which will be described below in more detail. If one or more of these state conditions are not detected, the process exits or returns to block 201. Also, if the call is terminated at any time after the SRAF process is triggered at block 201, the SRAF process terminates and/or returns to block 201.

In accordance with a representative embodiment, the preselected set of state conditions that is monitored can further include state conditions relating to caller history or caller ID history associated with the party to whom the call was placed or from whom the call was received, as indicated by block 203. This historical data can be analyzed to determine whether modem performance needs to be improved or is likely in need of improvement for the current call that is taking place. The historical data can be analyzed to determine, for example, call conditions that have historically occurred in the current geographical location (Geo location) of the PCD (e.g., more voice glitches, less network capability coverage, latency ping pongs, a large number of network drops in the Geo location/region). The historical data can also include caller or caller ID history that can be analyzed to determine, for example, whether calls with the other party participating in the call are usually of long duration and/or occur frequently indicating that the call is important and that modem performance improvement may be needed and/or that the thermal framework may need to be triggered, or involve a large amount of data transfer indicating a business- or work-related call, etc., for which modem performance improvement may be needed. Caller ID and caller history data can also include, for example, whether the other party participating in the call is in a speed dial list, a contact list, a favorite contacts list, is a contact that has been marked as important, is a contact that contains a key word such as, for example, "Mom", "Dad", "Sister", "Brother", "Family Member", etc. It should be noted that caller or caller ID historical data other than that discussed above with reference to block 203 can be monitored to determine whether or not more state conditions exist indicating that the Mod. Pow.-Perf. process should be launched.

If the monitored state condition(s) associated with the caller or caller ID historical data indicate that modem performance currently needs to be improved or will likely need to be improved for the current call, the process moves to block 205. Otherwise, the process exits or returns to block 201. Also, as indicated above, if the call is terminated at any time after the SRAF process is triggered at block 201, the SRAF process terminates and/or returns to block 201.

In accordance with a representative embodiment, the preselected set of state conditions can further include whether an original equipment manufacturer (OEM) setting in the PCD or a user setting in the PCD indicate that the Mod. Pow.-Perf. process should be launched for a particular type of call whenever the SRAF process is launched. For example, a particular type of call can be one for which the modem is assigned high priority in order to ensure that the modem exhibits high performance, such as a data call or video call, for example. If so, the process moves to block 205. If not, the process exits or returns to block 201.

It should be noted that state conditions of the PCD other than the examples given above with reference to blocks 202-204 can be monitored to determine whether or not the Mod. Pow.-Perf. process should be launched.

In accordance with a representative embodiment, the processes represented by blocks 202-204 are performed in parallel, but they could be performed in series or partially in parallel and partially in series. With respect to blocks 202 and 203, computer code comprising a condition state notifier and a caller/caller ID notifier, respectively, can be launched whenever the SRAF process is launched at block 201 to perform the monitoring tasks of blocks 202 and 203.

If any of the questions posed in blocks 202-204 are answered in the affirmative, the process moves to block 205 at which a determination is made as to whether triggering the Mod. Pow.-Perf. Process under current conditions for the current call will degrade visible performance of the PCD, as indicated by block 205. If it is determined at block 205 that triggering the Mod. Pow.-Perf. Process under current conditions for the current call will not degrade visible performance of the PCD, the process proceeds to block 206 of FIG. 2B at which the Mod. Pow.-Perf. process is triggered. Preferably, even after triggering the Mod. Pow.-Perf. Process at block 206, if the call is terminated, the SRAF process is terminated and the process returns to block 201.

When the Mod. Pow.-Perf. process is launched, the SRAF process proceeds to the process represented by block 207. Block 207 comprises the processes represented by blocks 103, 104 and 105 of FIG. 1. In block 207, the Mod. Pow.-Perf. process performs steps comprising at least one of, and preferably all of, the following: (1) dynamically updating modem system cache table entries to indicate to improve modem performance by setting cache table entries (setting cache table entries to, for example, indicate that the size of cache memory allocated to the modem is to be increased, that the rank of the modem for accessing cache memory is to be changed, that the modem is to be assigned a high priority classification for accessing cache memory, that a change to one or more policies relating to the modem accessing cache memory is to be made, that cache from some other subsystem pool is to be allocated to the modem), as indicated by block 103; (2) proactively triggering a thermal framework of the PCD to cause the thermal framework to perform power reduction in one or more non-modem processing cores (e.g., power reduction in one or more CPU, GPU, CDSP cores, etc.), as indicated by block 104; and (3) monitoring feedback from one or more IP blocks of the PCD regarding actual bandwidth needed by the IP block(s) and dynamically allocating bandwidth in excess of the actual bandwidth needed to a free pool that is accessible by the wireless modem for usage by the wireless modem for improving its performance, as indicated by block 105.

As indicated above, the known thermal framework in some PCDs disables modem features to reduce power usage to thereby reduce the temperature of the PCD until the heat is no longer sensed by the user. One disadvantage of the known thermal framework is that it is not proactive because it only reduces the temperature after the user has sensed the heat during a call of long duration. In other words, this type of thermal framework does not proactively mitigate the temperature increase before the heat is sensed by the user. Additionally, the known thermal framework is only employed during the use case of calls of long duration. In contrast, the process represented by block 104 proactively triggers the thermal framework of the present disclosure to reduce power usage by non-modem cores so that modem performance is not detrimentally impacted.

Thus, in accordance with representative embodiments of the present disclosure, modem performance is improved by dynamically updating cache table entries while concurrently reducing power usage in non-modem cores of the PCD to reduce the temperature of the PCD before heat is sensed by the user.

With respect to dynamically allocating BW usage for one or more IP blocks of the SoC based at least partially on feedback from the IP block(s) regarding actual BW needed under the current conditions for the current call, this can be performed by monitoring feedback received from each IP block or IP block subsystem and determining their actual required BW over a preselected period of time. Any BW in excess of the actual required BW can be allocated to a free pool that the wireless modem can access and use to improve its performance.

Figure 3:
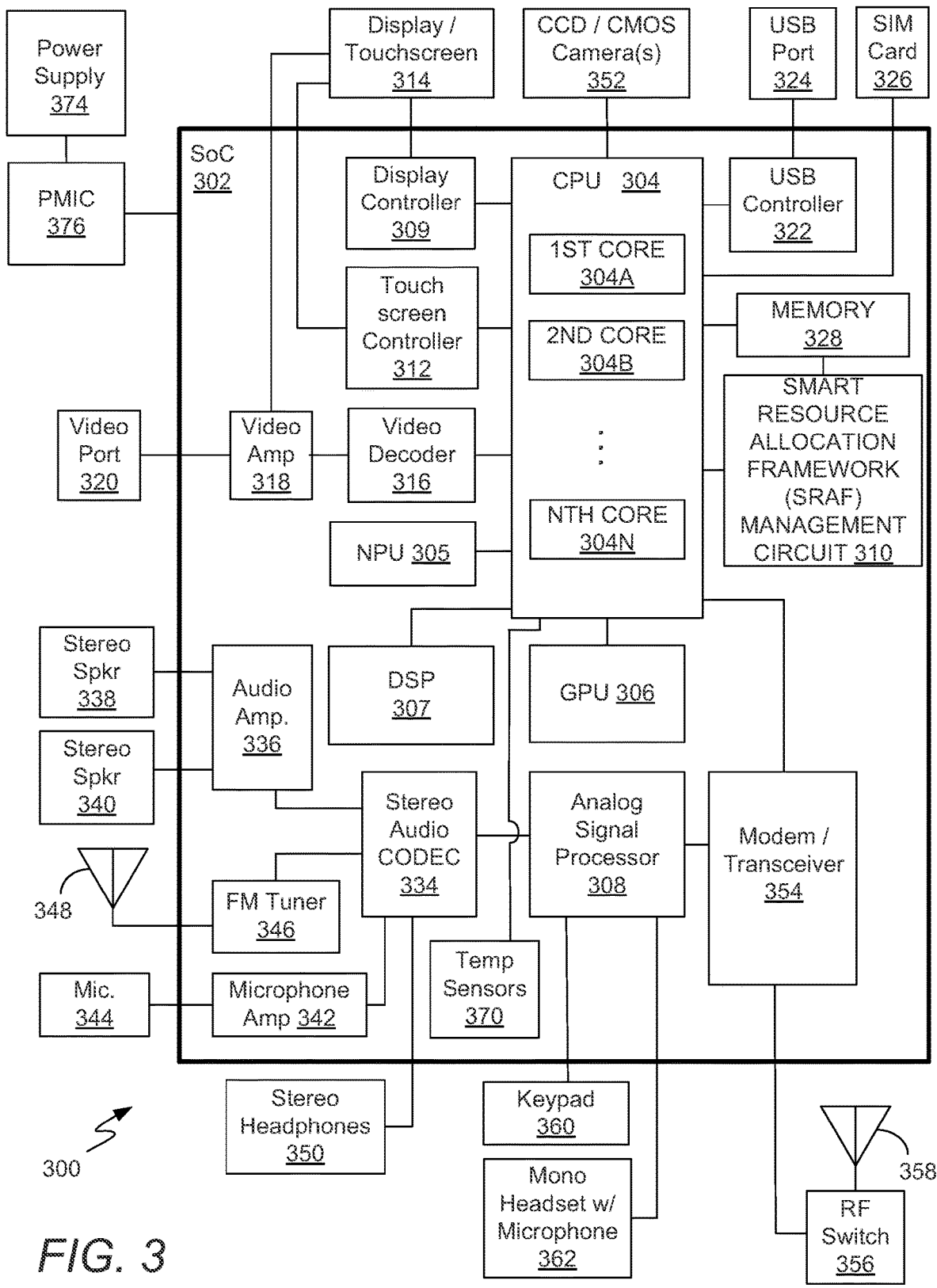
FIG. 3 illustrates an example of a PCD, such as, for example, a mobile phone in which exemplary embodiments of methods depicted in FIGS. 1-2B can be implemented.

The systems and methods of the present disclosure for providing the SRAF can be implemented in a PCD, although the inventive principles and concepts are not limited with respect to the type of device in which the method is implemented. FIG. 3 illustrates an example of a PCD 300, such as, for example, a mobile phone, a smartphone, a PDA, a portable game console, etc., in which exemplary embodiments of systems, methods, computer-readable media, in which the SRAF may be implemented.

For purposes of clarity, some interconnects, signals, etc., are not shown in FIG. 3. Although the PCD 300 is shown as an example, other embodiments of systems, methods, computer-readable media, and other examples of implementing the SRAF may be provided in other types of computing devices or systems. The PCD 300 may include an SoC 302. The SoC 302 may include a CPU 304, an NPU 305, a GPU 306, a DSP 307, an analog signal processor 308, a modem/modem subsystem 354, or other processors. The CPU 304 may include one or more CPU cores, such as a first CPU core 304A, a second CPU core 304B, etc., through an $N^{th}$ CPU core 304N, where N is a positive integer that is greater than or equal to one. Any one or more of the blocks of the SoC 302 shown in FIG. 3, as well as other IP blocks not explicitly shown in FIG. 3, can be the IP blocks involved in the process represented by block 105 in FIGS. 1 and 2B.

The cores 304A-304N may be configured to perform certain operations in accordance with the SRAF of the present disclosure. In accordance with a representative embodiment, the SoC 302 includes an SRAF management circuit 310 that communicates with the CPU 304 to perform the SRAF process of the present disclosure. The CPU cores 304A-304N perform other operations of the type that they normally perform in a PCD. Alternatively, or in addition, any of the processors, such as the NPU 305, GPU 306, DSP 307, etc., may perform some or all of those operations. It is also possible to implement the SRAF management circuit 310 partially or wholly within the CPU 304 instead of in a separate circuit.

A display controller 309 and a touch-screen controller 312 may be coupled to the CPU 304. A touchscreen display 314 external to the SoC 302 may be coupled to the display controller 309 and the touch-screen controller 312. The PCD 300 may further include a video decoder 316 coupled to the CPU 304. A video amplifier 318 may be coupled to the video decoder 316 and the touchscreen display 314. A video port 320 may be coupled to the video amplifier 318. A universal serial bus ("USB") controller 322 may also be coupled to CPU 304, and a USB port 324 may be coupled to the USB controller 322. A subscriber identity module ("SIM") card 326 may also be coupled to the CPU 304.

One or more memory devices 328 may be coupled to the CPU 304. The one or more memory devices 328 may include both volatile and non-volatile memories. Examples of volatile memories include static random access memory ("SRAM") and dynamic random access memory ("DRAM"). Such memories may be external to the SoC 302 or internal to the SoC 302. The one or memory devices 328 may include a local cache memory, a system-level cache memory and a LLC memory. The aforementioned cache table discussed above with reference to block 103 shown in FIGS. 1 and 2B can be stored in, for example, memory device 328.

A stereo audio CODEC 334 may be coupled to the analog signal processor 308. Further, an audio amplifier 336 may be coupled to the stereo audio CODEC 334. First and second stereo speakers 338 and 340, respectively, may be coupled to the audio amplifier 336. In addition, a microphone amplifier 342 may be coupled to the stereo audio CODEC 334, and a microphone 344 may be coupled to the microphone amplifier 342. A frequency modulation ("FM") radio tuner 346 may be coupled to the stereo audio CODEC 334. An FM antenna 348 may be coupled to the FM radio tuner 346. Further, stereo headphones 350 may be coupled to the stereo audio CODEC 334. Other devices that may be coupled to the CPU 304 include one or more digital (e.g., CCD or CMOS) cameras 352.

A wireless modem with RF transceiver 354 may be coupled to the analog signal processor 308 and the CPU 304. An RF switch 356 may be coupled to the RF transceiver 354 and an RF antenna 358. In addition, a keypad 360, a mono headset with a microphone 362, and a vibrator device 364 may be coupled to the analog signal processor 308. The SoC 302 may have one or more internal or on-chip thermal sensors 370. A power supply 374 and a PMIC 376 may supply power to the SoC 302.

Firmware or software may be stored in any of the above-described memory devices, or may be stored in a local memory directly accessible by the processor hardware on which the software or firmware executes. Execution of such firmware or software may control aspects of any of the above-described methods or configure aspects of any of the above-described systems. Any such memory or other non-transitory storage medium having firmware or software stored therein in computer-readable form for execution by processor hardware may be an example of a "computer-readable medium," as the term is understood in the patent lexicon.

With reference again to FIGS. 2A and 2B, if the call is terminated at any time during the SRAF process depicted in FIGS. 2A and 2B, the cache table entries that are altered at block 103/207 preferably are restored to their previous values, i.e., the values prior to the call being connected at block 201. Likewise, preferably any states that are altered by the power reduction steps that are performed at block 104/207 are restored to their previous values when the call is disconnected. Any BW settings of any of the IP blocks that were altered at step 105/207 to reallocate bandwidth can also be restored to their previous values when the call is disconnected.

Figure 4:
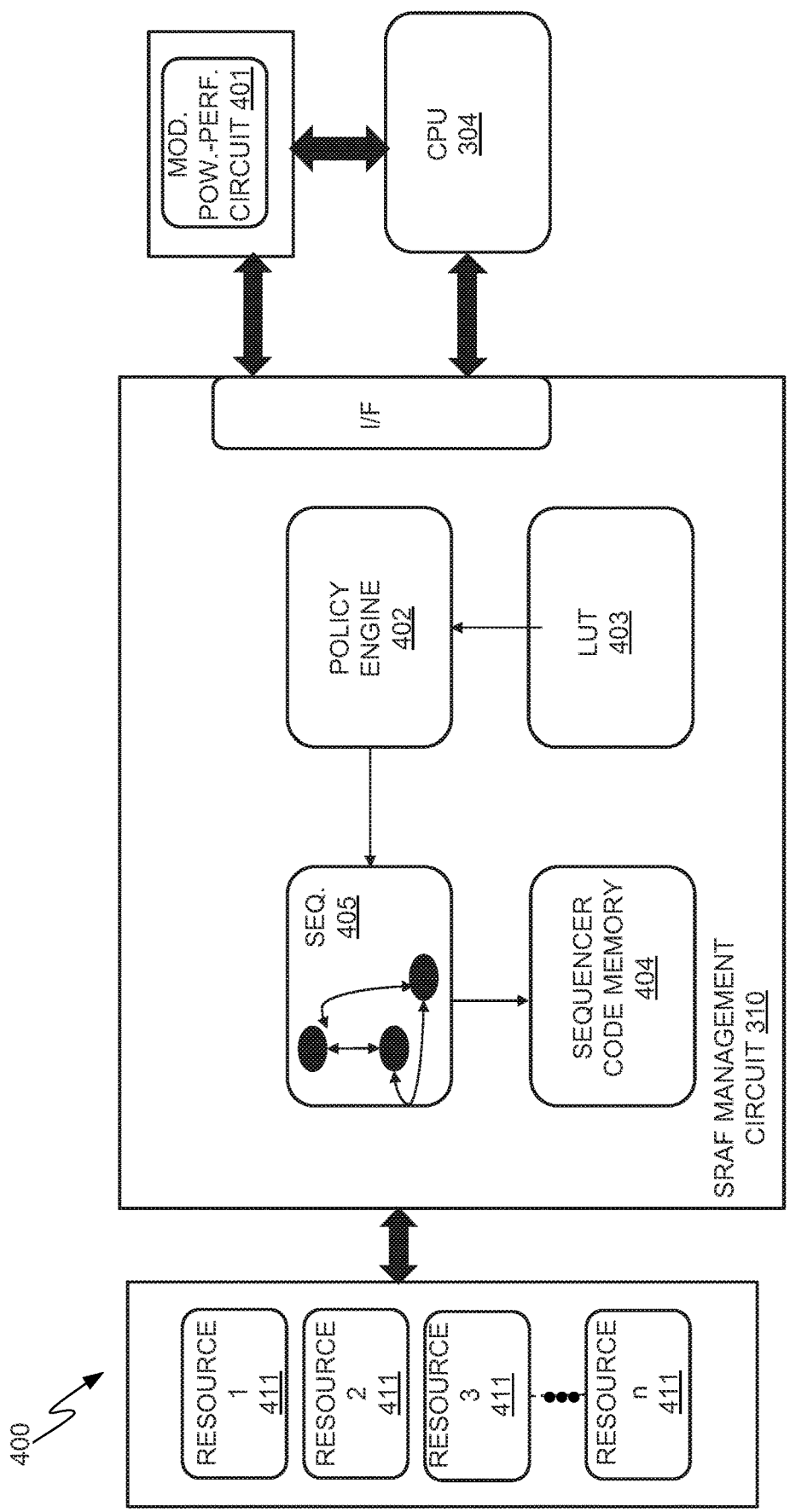
FIG. 4 is a block diagram of the SRAF system in accordance with a representative embodiment in which the system is implemented in a combination of hardware components comprising the SRAF management circuit 310 shown in FIG. 3 and software and/or firmware executed by the CPU 304 shown in FIG. 3.

The SRAF process described above can be implemented solely in hardware, in software and/or firmware executed by a processor such as CPU 304, for example, or in a combination of hardware, software and/or firmware. FIG. 4 is a block diagram of the SRAF system 400 in accordance with a representative embodiment in which the system 400 is implemented in a combination of hardware components comprising the SRAF management circuit 310 shown in FIG. 3 and software and/or firmware executed by the CPU 304 shown in FIG. 3. The SRAF management circuit 310 can be a state machine or a combination of state machines having configurable logic gates for performing the SRAF tasks. Settings to be used by the SRAF management circuit 304 to control its operations can be sent by the CPU 304 to the SRAF management circuit 304 and stored in a lookup table (LUT) 403. A resource allocation policy engine 402 performs the resource allocation tasks based on those settings. Thus, the CPU 304 can change resource allocation policies by altering or updating these settings.

A sequencer 405 controls the switching of states of the SRAF management circuit 310 as needed to sequence between processes to perform resource allocation tasks, and to trigger or exit from the SRAF and Mod. Pow.-Perf. processes and the appropriate times. Software and/or firmware can be stored in a sequencer code memory element 404 and used by the sequencer 405 to control its operations. Mod. Pow.-Perf. circuitry 401 is triggered by the SRAF management circuit 310 (block 206 of FIG. 2B) to cause it to perform its resource allocation tasks (blocks 103-105 and 207 of FIGS. 1 and 2B). Resources 1-n of the PCD are controlled by the SRAF management circuit 310 to perform resource allocation in the manner described above with reference to FIGS. 1-3, where n is a positive integer that is greater than or equal to one. Resources 1-n can correspond to any of the resources discussed above, including, for example, the resources identified in blocks 103-105.

It should be noted that some or all of the processes performed by SRAF management circuit 310 can instead be performed in software and/or firmware executed by the CPU 304.

Implementation examples are described in the following numbered clauses:

1. A portable computing device (PCD) having a wireless modem, the PCD comprising:
    a resource management circuit disposed on one or more integrated circuit (IC) chips of the PCD, the resource management circuit being configured to:
        determine if a call is received or placed by the PCD;
        monitor a preselected set of state conditions of the PCD in response to the call received or placed by the PCD;
        determine, based at least partially on the monitored preselected set of state conditions, if the wireless modem is to be placed in a modem power-performance (Mod. Pow.-Perf) mode; and
        in response to a determination that the wireless modem is be placed in the Mod. Pow.-Perf. mode, performing a Mod. Pow-Perf. process comprising at least one of:
            (1) dynamically updating one or more cache table entries associated with the wireless modem;
            (2) reducing power usage in one or more non-wireless modem processing cores to reduce a temperature of the PCD; and
            (3) allocating more bandwidth for the wireless modem.
2. The SRAF system of clause 1, wherein dynamically updating one or more cache table entries results in at least one of: an increase in the size of cache memory of the PCD allocated to the wireless modem; a change in a rank of the wireless modem for accessing the cache memory; an assignment of a high priority classification to the wireless modem for accessing the cache memory; a change in one or more policies relating to the wireless modem accessing the cache memory; an allocation to the wireless modem of cache memory from a subsystem pool of cache memory.
3. The SRAF system of clauses 1 or 2, wherein said one or more non-modem processing cores include one or more processing cores of a central processing unit (CPU) of the PCD, a graphical processing unit (GPU) of the PCD, and a core digital signal processor (CDSP) of the PCD.
4. The SRAF system of one or more of clauses 1-3, wherein if the call is disconnected after the cache table entries have been updated, the altered cache table entries are restored to values that existed prior to the call being received or placed.
5. The SRAF system of one or more of clauses 1-4, wherein the preselected set of state conditions comprises a state condition indicating that the display screen of the PCD is locked, a state condition indicating that the display screen is turned off, a state condition indicating that a proximity sensor of the PCD has sensed that the PCD is near an ear of the user, and a state condition indicating that a light sensor of the PCD has detected that the PCD is in a pocket of the user or a handbag of the user indicating that the user is talking via a Bluetooth headset paired with the PCD.
6. The SRAF system of one or more of clauses 1-4, wherein the preselected set of state conditions comprises a state condition relating to historical data associated with the party from whom the call was received or to whom the call was placed that indicates that performance of the modem will likely need to be improved for the call.
7. The SRAF system of clause 6, wherein the historical data comprises one or more of (1) a history of calls received or placed from a current geographical location (Geo location) of the PCD, (2) a history of voice glitches having occurred during calls with said party or in said Geo location, (3) a history of a lack of sufficient network coverage capability during calls with said party or in said Geo location, (4) a history of latency ping pongs having occurred during calls with said party or in said Geo location, (5) a history of calls with said party or in said Geo location having been dropped with said party or in said Geo location, (6) a history of calls with said party or in said Geo location being of long duration, (7) a history of calls with said party or in said Geo location occurring frequently, (8) a history of calls with said party or in said Geo location involving a large amount of data transfer.
8. The SRAF system of one or more of clauses 1-7, wherein the preselected set of state conditions comprises at least one of a state condition indicative of (1) whether an identifier associated with said party is listed on a speed dial list of the PCD, (2) whether an identifier associated with said party is on a contacts dial list of the PCD, (3) whether an identifier associated with said party is on a favorites contact list of the PCD, (4) whether an identifier associated with said party is on a list of the PCD of callers marked as important; and (5) whether an identifier associated with said party listed on a contact list of the PCD contains one or more particular keywords.
9. A method for performing resource management in a portable computing device (PCD), the method comprising:
    in a resource management circuit disposed on one or more integrated circuit (IC) chips of the PCD:
        determining if a call is received or placed by the PCD;
        monitoring a preselected set of state conditions of the PCD in response to the call received or placed by the PCD;
        determining, based at least partially on the monitored preselected set of state conditions, if the wireless modem is to be placed in a modem power-performance (Mod. Pow.-Perf.) mode; and in response to determining that the wireless modem is be placed in the Mod. Pow.-Perf. mode, performing a Mod. Pow.-Perf. process comprising at least one of:
  (1) dynamically updating one or more cache table entries associated with the wireless modem;
  (2) reducing power usage in one or more non-wireless modem processing cores of the PCD to reduce a temperature of the PCD; and
  (3) allocating more bandwidth for the wireless modem.

10. The method of clause 9, wherein dynamically updating one or more cache table entries results in at least one of: an increase in the size of cache memory of the PCD allocated to the wireless modem; a change in a rank of the wireless modem for accessing the cache memory; an assignment of a high priority classification to the wireless modem for accessing the cache memory; a change in one or more policies relating to the wireless modem accessing the cache memory; an allocation to the wireless modem of cache memory from a subsystem pool of cache memory.

11. The method of clauses 9 or 10, wherein said one or more non-modem processing cores include one or more processing cores of a central processing unit (CPU) of the PCD, a graphical processing unit (GPU) of the PCD, and a core digital signal processor (CDSP) of the PCD.

12. The method of one or more of clauses 9-11, further comprising:
  if the call is disconnected after the cache table entries have been updated, restoring the altered cache table entries to values that existed prior to the call being received or placed.

13. The method of one or more of clauses 9-12, wherein the preselected set of state conditions comprises one or more of a state condition indicating that the display screen of the PCD is locked, a state condition indicating that the display screen is turned off, a state condition indicating that a proximity sensor of the PCD has sensed that the PCD is near an ear of the user, a state condition indicating that a light sensor of the PCD has detected that the PCD is in a pocket of the user or a handbag of the user indicating that the user is talking via a Bluetooth headset paired with the PCD.

14. The method of one or more of clauses 9-13, wherein the preselected set of state conditions comprises state conditions relating to historical data associated with the party from whom the call was received or to whom the call was placed that indicates that performance of the modem will likely need to be improved for the call.

15. The method of clause 14, wherein the historical data comprises one or more of (1) a history of calls received or placed from a current geographical location (Geo location) of the PCD, (2) a history of voice glitches having occurred during calls with said party or in said Geo location, (3) a history of a lack of sufficient network coverage capability during calls with said party or in said Geo location, (4) a history of latency ping pongs having occurred during calls with said party or in said Geo location, (5) a history of calls with said party or in said Geo location having been dropped with said party or in said Geo location, (6) a history of calls with said party or in said Geo location being of long duration, (7) a history of calls with said party or in said Geo location occurring frequently, and (8) a history of calls with said party or in said Geo location involving a large amount of data transfer.

16. The method of one or more of clauses 9-14, wherein the preselected set of state conditions comprises at least one of a state condition indicative of (1) whether an identifier associated with said party is listed on a speed dial list of the PCD, (2) whether an identifier associated with said party is on a contacts dial list of the PCD, (3) whether an identifier associated with said party is on a favorites contact list of the PCD, (4) whether an identifier associated with said party is on a list of the PCD of callers marked as important; and (5) whether an identifier associated with said party listed on a contact list of the PCD contains one or more particular keywords.

17. A non-transitory computer-readable medium comprising computer instructions for execution by logic disposed on one or more integrated circuit (IC) chips of a portable computing device (PCD) for performing resource allocation in the PCD, the computer instructions comprising:
  a first set of instructions that determine if a call is received or placed by the PCD;
  a second set of computer instructions that monitors a preselected set of state conditions of the PCD; and
  a third set of computer instructions that, in response to a determination that the wireless modem is be placed in the Mod. Pow.-Perf. mode, performs at least one of:
    (1) dynamically updating one or more cache table entries associated with the wireless modem;
    (2) reducing power usage in one or more non-wireless modem processing cores to reduce a temperature of the PCD; and
    (3) allocating more bandwidth for the wireless modem.

18. The non-transitory computer-readable medium of clause 17, wherein dynamically updating one or more cache table entries results in at least one of: an increase in the size of cache memory of the PCD allocated to the wireless modem; a change in a rank of the wireless modem for accessing the cache memory; an assignment of a high priority classification to the wireless modem for accessing the cache memory; a change in one or more policies relating to the wireless modem accessing the cache memory; an allocation to the wireless modem of cache memory from a subsystem pool of cache memory.

19. The non-transitory computer-readable medium of clauses 17 or 18, wherein said one or more non-modem processing cores include one or more processing cores of a central processing unit (CPU) of the PCD, a graphical processing unit (GPU) of the PCD, and a core digital signal processor (CDSP) of the PCD.

20. The non-transitory computer-readable medium of one or more of clauses 17-20, further comprising:
  a fourth set of instructions, wherein if the call is disconnected after the cache table entries have been updated, the fourth set of instructions restores the altered cache table to values that existed prior to the call being received or placed.

21. The non-transitory computer-readable medium of one or more of clauses 17-20, wherein the preselected set of state conditions comprises one or more of a state condition indicating that the display screen of the PCD is locked, a state condition indicating that the display screen is turned off, a state condition indicating that a proximity sensor of the PCD has sensed that the PCD is near an ear of the user, and a state condition indicating that a light sensor of the PCD has detected that the PCD is in a pocket of the user or a handbag of the user indicating that the user is talking via a Bluetooth headset paired with the PCD.

22. The non-transitory computer-readable medium of one or more of clauses 17-21, wherein the preselected set of state conditions comprises state conditions relating to historical data associated with the party from whom the call was received or to whom the call was placed that indicates that performance of the modem will likely need to be improved for the call.

23. The non-transitory computer-readable medium of clause 22, wherein the historical data comprises one or more of (1) a history of calls received or placed from a current geographical location (Geo location) of the PCD, (2) a history of voice glitches having occurred during calls with said party or in said Geo location, (3) a history of a lack of sufficient network coverage capability during calls with said party or in said Geo location, (4) a history of latency ping pongs having occurred during calls with said party or in said Geo location, (5) a history of calls with said party or in said Geo location having been dropped with said party or in said Geo location, (6) a history of calls with said party or in said Geo location being of long duration, (7) a history of calls with said party or in said Geo location occurring frequently, and (8) a history of calls with said party or in said Geo location involving a large amount of data transfer.

24. The non-transitory computer-readable medium of one or more of clauses 17-23, wherein the preselected set of state conditions comprises at least one of a state condition indicative of (1) whether an identifier associated with said party is listed on a speed dial list of the PCD, (2) whether an identifier associated with said party is on a contacts dial list of the PCD, (3) whether an identifier associated with said party is on a favorites contact list of the PCD, (4) whether an identifier associated with said party is on a list of the PCD of callers marked as important; and (5) whether an identifier associated with said party listed on a contact list of the PCD contains one or more particular keywords.

25. A portable computing device (PCD) having a wireless modem, the PCD comprising:
   means disposed on one or more integrated circuit (IC) chips of the PCD for performing resource allocation, the means being configured to:
      determine if a call is received or placed by the PCD;
      monitor a preselected set of state conditions of the PCD in response to the call received or placed by the PCD;
      determine, based at least partially on the monitored preselected set of state conditions, if the wireless modem is to be placed in a modem power-performance (Mod. Pow.-Perf.) mode; and
      in response to a determination that the wireless modem is be placed in the Mod. Pow.-Perf. mode, performing a Mod. Pow-Perf. process comprising at least one of:
         (1) dynamically updating one or more cache table entries associated with the wireless modem;
         (2) reducing power usage in one or more non-wireless modem processing cores to reduce a temperature of the PCD; and
         (3) allocating more bandwidth for the wireless modem.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A portable computing device (PCD) having a wireless modem, the PCD comprising:
   a resource management circuit disposed on one or more integrated circuit (IC) chips of the PCD, the resource management circuit being configured to:
   determine if a call is received or placed by the PCD;
   monitor a preselected set of state conditions of the PCD in response to the call received or placed by the PCD;
   determine, based at least partially on the monitored preselected set of state conditions, if the wireless modem is to be placed in a modem power-performance (Mod. Pow.-Perf.) mode; and
   in response to a determination that the wireless modem is to be placed in the Mod. Pow.-Perf. mode, performing a Mod. Pow-Perf. process comprising two or more of:
      (1) dynamically updating one or more cache table entries associated with the wireless modem;
      (2) reducing power usage in one or more non-modem processing cores to reduce a temperature of the PCD; and
      (3) allocating more bandwidth for the wireless modem.

2. The PCD of claim 1, wherein dynamically updating one or more cache table entries results in at least one of: an increase in the size of cache memory of the PCD allocated to the wireless modem; a change in a rank of the wireless modem for accessing the cache memory; an assignment of a high priority classification to the wireless modem for accessing the cache memory; a change in one or more policies relating to the wireless modem accessing the cache memory; an allocation to the wireless modem additional from a subsystem pool of cache memory.

3. The PCD of claim 1, wherein said one or more non-modem processing cores include at least one of: one or more processing cores of a central processing unit (CPU) of the PCD, a graphical processing unit (GPU) of the PCD, and a core digital signal processor (CDSP) of the PCD.

4. The PCD of claim 1, wherein if the call is disconnected after the one or more cache table entries have been updated, the one or more cache table entries are restored to values that existed prior to the call being received or placed.

5. The PCD of claim 1, wherein the preselected set of state conditions comprises a state condition indicating that a display screen of the PCD is locked, a state condition indicating that the display screen is turned off, a state condition indicating that a proximity sensor of the PCD has sensed that the PCD is near an ear of a user, and a state condition indicating that a light sensor of the PCD has detected that the PCD is in a pocket of the user or a handbag of the user indicating that the user is talking via a Bluetooth headset paired with the PCD.

6. The PCD of claim 1, wherein the preselected set of state conditions comprises a state condition relating to historical data associated with a party from whom the call was received or to whom the call was placed that indicates that performance of the modem will likely needs to be improved for the call.

7. The PCD of claim 6, wherein the historical data comprises one or more of (1) a history of calls received or placed from a current geographical location (Geo location) of the PCD, (2) a history of voice glitches having occurred during calls with said party or in said Geo location, (3) a history of a lack of sufficient network coverage capability during calls with said party or in said Geo location, (4) a history of latency ping pongs having occurred during calls with said party or in said Geo location, (5) a history of calls with said party or in said Geo location having been dropped with said party or in said Geo location, (6) a history of calls with said party or in said Geo location exceeding a time duration, (7) a history of calls with said party or in said Geo location exceeding a threshold number of calls, (8) a history of calls with said party or in said Geo location exceeding a data transfer threshold.

8. The PCD of claim 7, wherein the preselected set of state conditions comprises at least one of a state condition indicative of (1) whether an identifier associated with said party is listed on a speed dial list of the PCD, (2) whether an identifier associated with said party is on a contacts dial list of the PCD, (3) whether an identifier associated with said party is on a favorites contact list of the PCD, (4) whether an identifier associated with said party is on a list of the PCD of callers marked as important; and (5) whether an identifier associated with said party listed on a contact list of the PCD contains one or more particular keywords.

9. A method for performing resource management in a portable computing device (PCD), the method comprising:
   in a resource management circuit disposed on one or more integrated circuit (IC) chips of the PCD:
      determining if a call is received or placed by the PCD;
      monitoring a preselected set of state conditions of the PCD in response to the call received or placed by the PCD;
      determining, based at least partially on the monitored preselected set of state conditions, if the wireless modem is to be placed in a modem power-performance (Mod. Pow.-Perf.) mode;
      and
      in response to determining that the wireless modem is to be placed in the Mod. Pow.-Perf. mode, performing a Mod. Pow.-Perf. process comprising two or more of:
         (1) dynamically updating one or more cache table entries associated with the wireless modem;
         (2) reducing power usage in one or more non-modem processing cores of the PCD to reduce a temperature of the PCD; and
         (3) allocating more bandwidth for the wireless modem.

10. The method of claim 9, wherein dynamically updating one or more cache table entries results in at least one of: an increase in the size of cache memory of the PCD allocated to the wireless modem; a change in a rank of the wireless modem for accessing the cache memory; an assignment of a high priority classification to the wireless modem for accessing the cache memory; a change in one or more policies relating to the wireless modem accessing the cache memory; an allocation to the wireless modem of additional cache memory from a subsystem pool.

11. The method of claim 9, wherein said one or more non-modem processing cores include at least one of: one or more processing cores of a central processing unit (CPU) of the PCD, a graphical processing unit (GPU) of the PCD, and a core digital signal processor (CDSP) of the PCD.

12. The method of claim 9, further comprising:
   if the call is disconnected after the one or more cache table entries have been updated, restoring the one or more cache table entries to values that existed prior to the call being received or placed.

13. The method of claim 9, wherein the preselected set of state conditions comprises one or more of a state condition indicating that a display screen of the PCD is locked, a state condition indicating that the display screen is turned off, a state condition indicating that a proximity sensor of the PCD has sensed that the PCD is near an ear of a user, a state condition indicating that a light sensor of the PCD has detected that the PCD is in a pocket of the user or a handbag of the user indicating that the user is talking via a Bluetooth headset paired with the PCD.

14. The method of claim 9, wherein the preselected set of state conditions comprises state conditions relating to historical data associated with a party from whom the call was received or to whom the call was placed that indicates that performance of the modem needs to be improved for the call.

15. The method of claim 14, wherein the historical data comprises one or more of (1) a history of calls received or placed from a current geographical location (Geo location) of the PCD, (2) a history of voice glitches having occurred during calls with said party or in said Geo location, (3) a history of a lack of sufficient network coverage capability during calls with said party or in said Geo location, (4) a history of latency ping pongs having occurred during calls with said party or in said Geo location, (5) a history of calls with said party or in said Geo location having been dropped with said party or in said Geo location, (6) a history of calls with said party or in said Geo location exceeding a time duration, (7) a history of calls with said party or in said Geo location exceeding a threshold number of calls, (8) a history of calls with said party or in said Geo location exceeding a data transfer threshold.

16. The method of claim 14, wherein the preselected set of state conditions comprises at least one of a state condition indicative of (1) whether an identifier associated with said party is listed on a speed dial list of the PCD, (2) whether an identifier associated with said party is on a contacts dial list of the PCD, (3) whether an identifier associated with said party is on a favorites contact list of the PCD, (4) whether an identifier associated with said party is on a list of the PCD of callers marked as important; and (5) whether an identifier associated with said party listed on a contact list of the PCD contains one or more particular keywords.

17. A non-transitory computer-readable medium comprising computer instructions for execution by logic disposed on one or more integrated circuit (IC) chips of a portable computing device (PCD) for performing resource allocation in the PCD, the computer instructions comprising:
   a first set of computer instructions that determine if a call is received or placed by the PCD;
   a second set of computer instructions that monitors a preselected set of state conditions of the PCD;
   and a third set of computer instructions that, in response to a determination that the wireless modem is to be placed in the Mod. Pow.-Perf. mode, performs two or more of:
(1) dynamically updating one or more cache table entries associated with the wireless modem;
(2) reducing power usage in one or more non-modem processing cores to reduce a temperature of the PCD; and
(3) allocating more bandwidth for the wireless modem.

18. The non-transitory computer-readable medium of claim 17, wherein dynamically updating one or more cache table entries results in at least one of: an increase in the size of cache memory of the PCD allocated to the wireless modem; a change in a rank of the wireless modem for accessing the cache memory; an assignment of a high priority classification to the wireless modem for accessing the cache memory; a change in one or more policies relating to the wireless modem accessing the cache memory; an allocation to the wireless modem of additional cache memory from a subsystem pool.

19. The non-transitory computer-readable medium of claim 17, wherein said one or more non-modem processing cores include at least one of: one or more processing cores of a central processing unit (CPU) of the PCD, a graphical processing unit (GPU) of the PCD, and a core digital signal processor (CDSP) of the PCD.

20. The non-transitory computer-readable medium of claim 18, further comprising:
a fourth set of computer instructions, wherein if the call is disconnected after the one or more cache table entries have been updated, the fourth set of instructions restores the one or more cache table entries to values that existed prior to the call being received or placed.

21. The non-transitory computer-readable medium of claim 17, wherein the preselected set of state conditions comprises one or more of a state condition indicating that a display screen of the PCD is locked, a state condition indicating that the display screen is turned off, a state condition indicating that a proximity sensor of the PCD has sensed that the PCD is near an ear of a user, and a state condition indicating that a light sensor of the PCD has detected that the PCD is in a pocket of the user or a handbag of the user indicating that the user is talking via a Bluetooth headset paired with the PCD.

22. The non-transitory computer-readable medium of claim 17, wherein the preselected set of state conditions comprises state conditions relating to historical data associated with a party from whom the call was received or to whom the call was placed that indicates that performance of the modem needs to be improved for the call.

23. The non-transitory computer-readable medium of claim 22, wherein the historical data comprises one or more of (1) a history of calls received or placed from a current geographical location (Geo location) of the PCD, (2) a history of voice glitches having occurred during calls with said party or in said Geo location, (3) a history of a lack of sufficient network coverage capability during calls with said party or in said Geo location, (4) a history of latency ping pongs having occurred during calls with said party or in said Geo location, (5) a history of calls with said party or in said Geo location having been dropped with said party or in said Geo location, (6) a history of calls with said party or in said Geo location exceeding a time duration, (7) a history of calls with said party or in said Geo location exceeding a threshold number of calls, (8) a history of calls with said party or in said Geo location exceeding a data transfer threshold.

24. The non-transitory computer-readable medium of claim 22, wherein the preselected set of state conditions comprises at least one of a state condition indicative of (1) whether an identifier associated with said party is listed on a speed dial list of the PCD, (2) whether an identifier associated with said party is on a contacts dial list of the PCD, (3) whether an identifier associated with said party is on a favorites contact list of the PCD, (4) whether an identifier associated with said party is on a list of the PCD of callers marked as important; and (5) whether an identifier associated with said party listed on a contact list of the PCD contains one or more particular keywords.

* * * * *